United States Patent
Campagnoni et al.

(10) Patent No.: US 6,182,154 B1
(45) Date of Patent: Jan. 30, 2001

(54) UNIVERSAL OBJECT REQUEST BROKER ENCAPSULATER

(75) Inventors: Frank Richard Campagnoni; Michael Haden Conner; Raghu Vishwanath Hudli; Marc Gregory Smith, all of Austin, TX (US)

(73) Assignee: International Business Machines Corporation, Aromonk, NY (US)

( * ) Notice: Under 35 U.S.C. 154(b), the term of this patent shall be extended for 0 days.

(21) Appl. No.: 08/838,458

(22) Filed: Apr. 7, 1997

Related U.S. Application Data (63) Continuation of application No. 08/342,508, filed on Nov. 21, 1994, now abandoned.

(51) Int. Cl.[7] .................................. G06F 9/00; G06F 9/46; G06F 15/163

(52) U.S. Cl. ............................................................ 709/315

(58) Field of Search .................................... 395/680–685; 709/310–332

(56) References Cited

U.S. PATENT DOCUMENTS

| | | |
|---|---|---|
| 4,251,687 | 2/1981 | Deutsch . |
| 4,984,177 | 1/1991 | Roundel et al. . |
| 5,181,247 | 1/1993 | Holl . |
| 5,187,790 * | 2/1993 | East et al. ............................ 395/725 |
| 5,255,326 | 10/1993 | Stevenson . |
| 5,274,740 | 12/1993 | Davis et al. . |
| 5,315,709 | 5/1994 | Alston, Jr. et al. . |
| 5,329,619 * | 7/1994 | Page et al. ............................ 395/200 |
| 5,475,817 * | 12/1995 | Waldo .................................. 395/650 |
| 5,481,721 * | 1/1996 | Serlet et al. ......................... 395/780 |
| 5,511,197 * | 4/1996 | Hiel et al. ............................ 395/700 |
| 5,732,270 * | 3/1998 | Foody et al. ........................ 395/683 |

OTHER PUBLICATIONS

The Common Object Request Broker: Architecture and Specification, Object Management Group and X/Open, Digital Equipment Corporation, Hewlett–Packard Company, HyperDesk Corporation, NCR Corporation, Object Design, Inc. and SunSoft, Inc.
G. H. Gonnet "Handbook of Algorithms & Data Structures", Addison–Wesley, 1984, p. 23.*
W. Richard Stevens, "Unix Network Programming" Prentice Hall, 1990, pp. 88, 185.*
John Rymer, "Distributed object interoperability", Distributed Computing Monitor, v10, n3, p3(26), Mar. 1995.*
ICL, "ORB Interoperability", OMG document 94.3.3, Mar. 1994.*
Universal Networked Objects, OMG TC document 94.9.32, Sep. 1994.*
BNR, "OMG Object Request Broker 2.0 Interoperability and Initialisation RFP Response", Mar. 1994.*
The Common Object Request Broker: Architecture and Specification by Object Management Group and X/Open. Copyright 1991, 1992 by Digital Equipment Corporation, Hewlett–Packard Company, HypeDesk Corp., NCR Corp. Object Design, Inc. SunSoft, Inc.

* cited by examiner

*Primary Examiner*—Majid Banankhah
*Assistant Examiner*—P. G. Caldwell
(74) *Attorney, Agent, or Firm*—David A. Mims, Jr.

(57) ABSTRACT

A mechanism for passing a request from a calling object in a first address space to a target object in a second address space. First, the request is passed from the calling object to an object request broker (more general term?) to which the calling object is written which normally handles requests to remote objects for the calling object. Responsive to a determination that the target object is foreign to the object request broker, a foreign object request broker to which the target object is written is located. A proxy object is generated according to the protocol of the foreign object request broker and stored in the first address space. A pointer is returned to calling object so that communication from the calling object to the target object may be established through the proxy object.

16 Claims, 11 Drawing Sheets

UNIVERSAL OBJECT REQUEST BROKER ENCAPSULATER

This is a continuation of application Ser. No. 08/342,508 filed Nov. 21, 1994, now abandoned.

BACKGROUND OF THE INVENTION

This invention relates generally to data processing systems. More particularly, it relates to communications between objects in different address spaces.

Object oriented programming (OOP) has been touted as a promising new technology to speed the development of software by allowing more efficient reuse and customization of software modules called objects. Objects are units of software which encapsulate both data and methods, an organization which makes the software both easier to maintain and enhance. Despite its promise, object oriented technology is only starting to be utilized in major commercial software products.

Several obstacles confront the software developer in using OOP. The first obstacle is the plethora of object oriented languages and toolkits which embrace different incompatible models of what objects are and how they should behave. For example, "pure" object oriented languages such as Smalltalk operate smoothly so long as they are in the supplied runtime environment. When interacting with foreign environments, the objects are reduced to data structures which do not retain the advantages of encapsulation and reuse which objects offer. Hybrid languages such as C++ require less runtime support, but employ tight bindings between the objects and their clients which means that the client programs have to be recompiled even when relatively minor changes are made to the objects. In summary, objects developed in one language could rarely be used in another.

The System Object Model, "SOM", is an object oriented technology designed to unite various object oriented approaches. In SOM, the interfaces of the classes of objects, the methods they support, the return types, and so forth are specified in the Interface Definition Language. The actual implementation of the object class can be written in any language the developer prefers, even a procedural language such as C. Thus, the advantages of OOP can be extended to programmers of non-object oriented programming languages. SOM is described in greater detail in copending and commonly assigned application, Ser. No. 07/805,668 "Language Neutral Objects" filed May 4, 1992 to M. Conner et al. which is hereby incorporated by reference.

Various standards bodies exist which encourage compliance to certain standard architectures. One of these standards is the Common Object Request Broker Architecture (CORBA) promulgated by the Object Management Group (OMG) and X/Open. The Object Request Broker (ORB) described in the architecture is analogous to the Remote Procedure Call (RPC) familiar to those working in the UNIX environments. Like the RPC, an ORB is a mechanism which allows processes working in one address space to communicate with others in another address space. An ORB intercepts a call from an object in one address space, encapsulates it into a network protocol, decodes the call for the target object in another address space and returns the results back to the calling object. Object Request Broker is an a improvement upon the RPC as it is designed to provide the higher level of flexibility and power offered by object oriented programming.

Unfortunately, since CORBA specifies the ORB interface but little about how ORBs function, it is possible to write ORBs which are CORBA compliant, but do not communicate with each other. In fact, this is the rule rather than the exception. Of the five or six ORB implementations known to the applicants, none can handle objects native to another ORB. Nor can the ORBs communicate with one another.

The present invention provides a mechanism for interconnecting a theoretically unlimited number of Object Request Brokers with arbitrary implementations.

SUMMARY OF THE INVENTION

Therefore, it is an object of the invention to pass requests from requesters to a target objects written to different object request brokers.

It is another object of the invention to minimize the overhead associated with the gateway mechanism.

It is another object of the invention to limit the necessary change to existing object request broker implementations.

It is another object of the invention to maintain the transparency of the gateway mechanism to requestors.

These and other objects are accomplished by a mechanism for passing a request from a calling object in a first address space to a target object in a second address space written to different ORBS. First, the request is passed from the calling object to an object request broker to which the calling object is written which normally handles requests to remote objects for the calling object. Responsive to a determination that the target object is foreign to the object request broker, a foreign object request broker to which the target object is written is located. A proxy object is generated according to the protocol of the foreign object request broker and stored in the first address space. A pointer is returned to calling object so that communication from the calling object to the target object may be established through the proxy object.

The preferred mechanism to determine the foreign object request broker is a manager of proxy managers object to which is registered a plurality of proxy manager each of which creates proxy objects for a respective foreign ORB. The manager of proxy manager repetitively passes the target object identifier to each proxy manager until a proxy manager is found which recognizes the target object. The recognizing proxy manager creates the proxy object. One preferred embodiment places the manager of proxy managers and its associated proxy mangers on a gateway machine to limit the overhead of the process to a single powerful server rather than duplicate the mechanism throughout a network.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM) for more information on the IBM OS/2 2.0 Operating System the reader is referred to *OS/2 2.0 Technical Library, Programming Guide Vol.* 1, 2, 3 Version 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
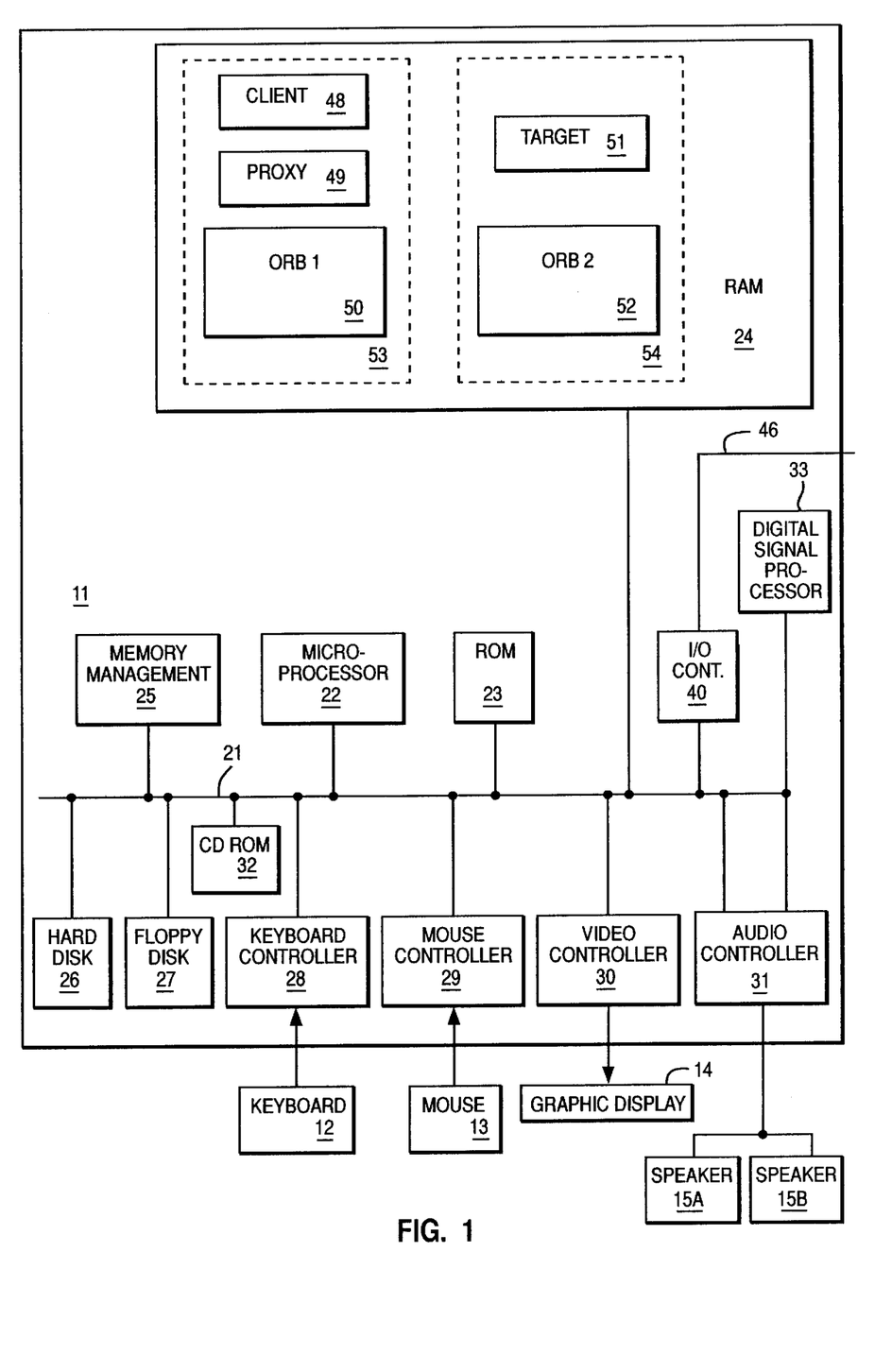
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. An I/O controller 40 such as a Token Ring Adapter enables communication over a network 46 to other similarly configured data processing systems.

One of the preferred implementations of the invention is as a set of instructions 48–52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. The memory address spaces coupled together by means of the ORBs can be resident in separate systems communicating over the network 46 or can be two or more address spaces in 53, 54 the memory of a single computer system as depicted in FIG. 1.

The Common Object Request Broker Architecture (CORBA) promulgated by OMG, is an object model whose goal is to isolate the requestor of services, e.g., clients, from the providers of services by a defined object oriented interface. By implementing an object request broker (ORB) to the CORBA specification, a developer will be able to integrate with a wide variety of object systems, also written to the CORBA spec. The structure of an individual object request broker is discussed in detail in Chapter 3 of *The Common Object Request Broker: Architecture and Specification* Published by the Object Management Group and X/Open (1992) which is hereby incorporated by reference. The CORBA interface is subdivided into those operations which are the same for all objects in the ORB, those operations which are specific to particular types of objects and those operations which are specific to particular styles of object implementations. Some of these interfaces include dynamic invocation interfaces, IDL stub interfaces, the ORB interface, the IDL skeleton interface and the object adapter interfaces. ORBs can be client or server based, system based or library based. The ORB core is the portion of the ORB which is actually transfers the request from client object to the target object. The client is the entity requesting a service to be performed. The target object is often a server process and is the entity which performs the desired service.

Central to the CORBA architecture is the Object Request Broker (ORB). The ORB is responsible for finding the target object which can satisfy the client's request to prepare the target object to receive the request and to return the which fulfills the request. Clients typically request services by issuing requests. A request will normally include an object reference as well as values for other parameters in the request to denote a particular target object from which services are requested. The target object includes the code and data which actually implements the service. The ORB mechanisms are transparent to the objects which make requests and receive responses to and from other objects. Different applications and different machines in a heterogenous distributed environment can theoretically seamlessly interconnect between multiple object system.

As mentioned previously, the ORB is not required to be implemented in any particular way, but rather to be "CORBA-compliant", it must conform only to the CORBA architecture's defined interfaces. The different ORB implementations do indeed make quite different choices, which causes the incompatibility problem solved by this invention.

Distributed SOM (DSOM) is an extension to the System Object Model (SOM) which is a preferred means of carrying out the present invention. DSOM is disclosed in commonly assigned, copending application, Ser. No. 08/077,219 entitled "Method and Apparatus for Utilizing Proxy Objects to Communicate with Target Objects", filed Jun. 14, 1993 which is hereby incorporated by reference. SOM and DSOM are also described in "SOMObjects Developer Toolkit" 596F-8649-00 publication of the IBM Corporation. SOM is a single address space object model directed to requester processes or objects utilizing only those objects located within the same address space as the requester process or object. The DSOM ORB implementation allows a requestor process or object in one address space to make calls on target objects residing in other address spaces. While much of the following description discusses a "client object", it is not necessary that the requester be either a client or an object to take advantage of DSOM. It may, for example, be a server process which requires a service to be performed by another server. A client object accesses a remote target object with the same call format used for accessing a target object located in the same address space as the client object. The DSOM ORB transmits the call from the client process or object to the target object and returns the results from the target object to the client object. As taught in the incorporated application, the means by which a client object accesses an ORB is a surrogate or proxy object which is typically created in the local address space. The proxy object is often much smaller than the target object. It provides a mechanism to communicate with the target object, intercepting the call to the target object from the requester, repackaging the call in a network protocol and sending and retrieving the call to and from the target object across the network.

The ORBs may bridge local address spaces within the same memory or machine or may bridge remote address spaces in different machines across a distributed environment. ORB 1, for example, may bridge address spaces in machine A and machine B. Thus, there are objects on both machines which use the same object reference and communication mechanism and an object reference can be freely passed from machine A to machine B for objects or clients implemented according to ORB 1. ORB 2 might be also implemented on machine A, bridging address spaces within the same machine, but, for example, would not be implemented on machine B. The present invention provides a mechanism for client objects implemented on ORB 2 in machine A to communicate with objects implemented on ORB 1 in machines A or B.

Figure 2:
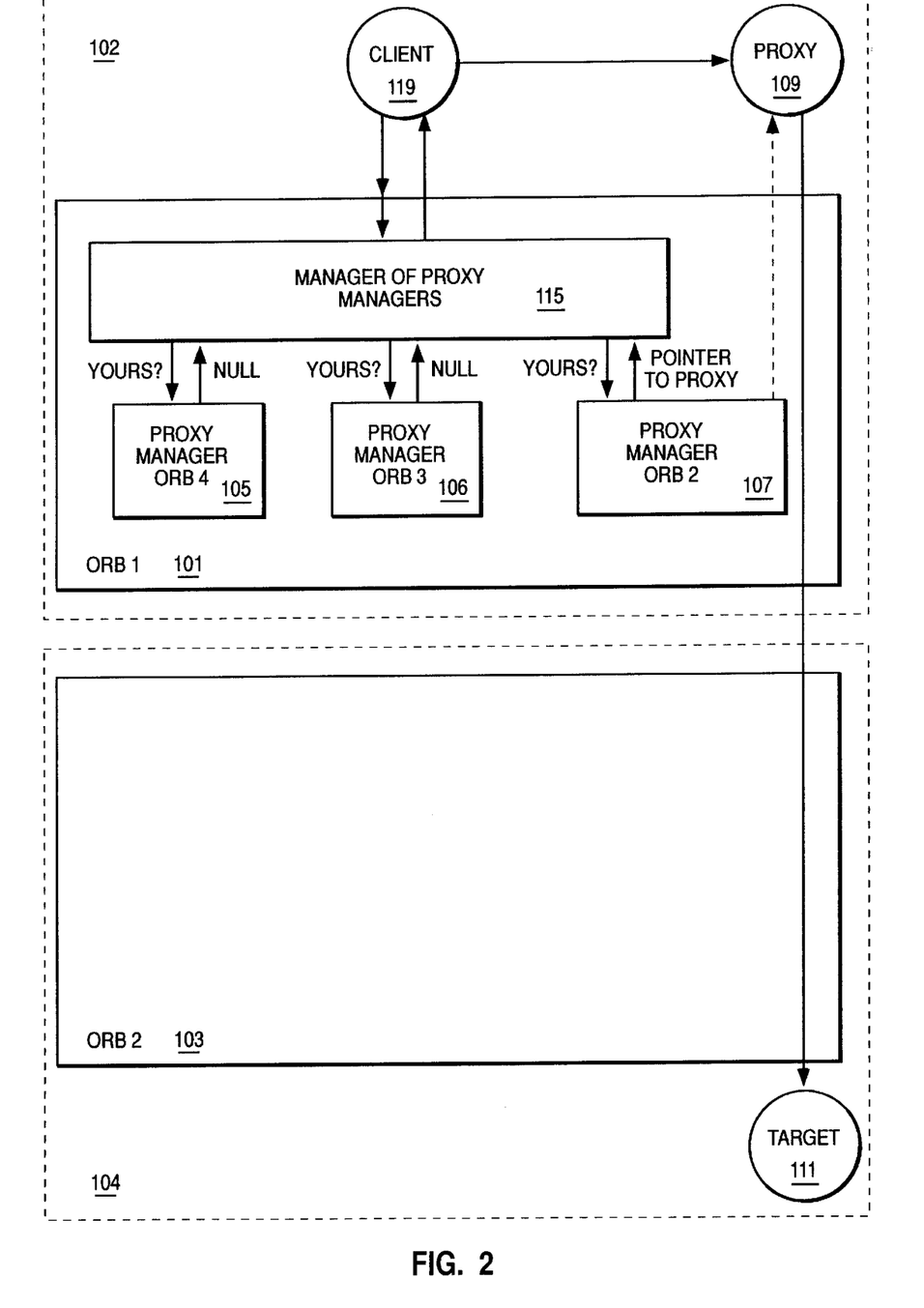
FIG. 2 depicts the proxy object manager and associated modules in several address spaces.

By use of the present invention, the ORBs are able to pass a call from one object in a first address space implemented according to a first ORB to a target object in a second address space implemented according to a second ORB. Referring to FIG. 2, the invention provides a single integrating framework for interconnecting a theoretically unlimited number of ORBs with arbitrary implementations. Only two ORBs 101, 103 are shown in single address spaces for ease of illustration, although many more ORBs could conceivably exist, particularly in a large distributed system. The ORBs connect different address spaces 102, 104 which exist on the same or different machines; different ORBs may also be connected to the same address space. Within one ORB 101, a plurality of proxy manager objects 105, 107 are part of the ORB and are responsible for generating local proxy objects 109 for the remote objects 111 in the ORB with which the respective proxy manager is associated. A manager of the proxy manager object 115 manages the proxy manager objects. Again, for sake of simplicity, only one set of proxy manager objects and one proxy and target object is shown. With the embodiment shown in the figure, objects written to ORB 101 may communicate with objects written to foreign ORBs. In alternative embodiments, objects written to other ORBs communicate with objects foreign to those ORBs, complementary sets of a manager of proxy managers and a plurality proxy manager objects exist. Each ORB would have a set if that ORB is to have the interoperability with objects written to foreign ORBs, the set would have a proxy manager object for each foreign ORB with which it wants to communicate.

An ORB receives method invocations from the client object on the proxy objects created by its proxy managers, redispatching the client's request in a syntax appropriate for that ORB. The method invocations which the client makes are essentially the same format whether the target object is local or remote written to the native ORB or a foreign ORB. Thus, transparency to the client is maintained by the invention. With the creation of the proxy the client thinks it is calling a local object. The ORBs handle all the mechanisms needed to transport the requests to remote targets. In the preferred embodiment, the Distributed System Object Model (DSOM) from the IBM Corporation provides the interoperability between ORBs. SOM encapsulates the necessary functionality to send a message via a foreign ORB behind a uniform object presentation. The proxy objects are the parts of the ORB which provides the portals to other ORBs.

Processing of requests for remote objects within an ORB proceeds as usual until a foreign object is detected. That is, for native, but remote objects, proxy objects are built to handle communication across the network to target objects. Each object has associated with it an identifier which is unique to that object. The ORB requires the target object's identifier to route a call to the target object. At some point, an ORB will receive an object identifier which it does not recognize as originating within its domain. To resolve the foreign object reference, the ORB makes a call on the manager of proxy managers object 115. The manager of proxy manager 115 polls the available proxy manager objects 105–107 for the other ORBs to find one which recognizes the object reference. When the correct proxy manager 107 is found, the proxy manager 107 associated with the foreign ORB builds a proxy object 109 for the target object 111 and returns a pointer 117 to the manager of proxy managers 115. The manager of proxy managers 115 returns a copy of the pointer 117 to the calling routine 119. The calling routine 119 then wraps the object pointer with the appropriate object reference abstraction. The proxy manager encapsulates the pointer according to the presentation that the entity should take within other data structures, APIs, objects and so forth. Whenever a method is invoked on the proxy object 109, it is received by the ORB corresponding to that proxy object 109 and handled in an appropriate fashion. The "appropriate fashion" is in a manner consistent with the particular ORB implementation, for example, the way that particular ORB implementation processes requests.

Figure 3:
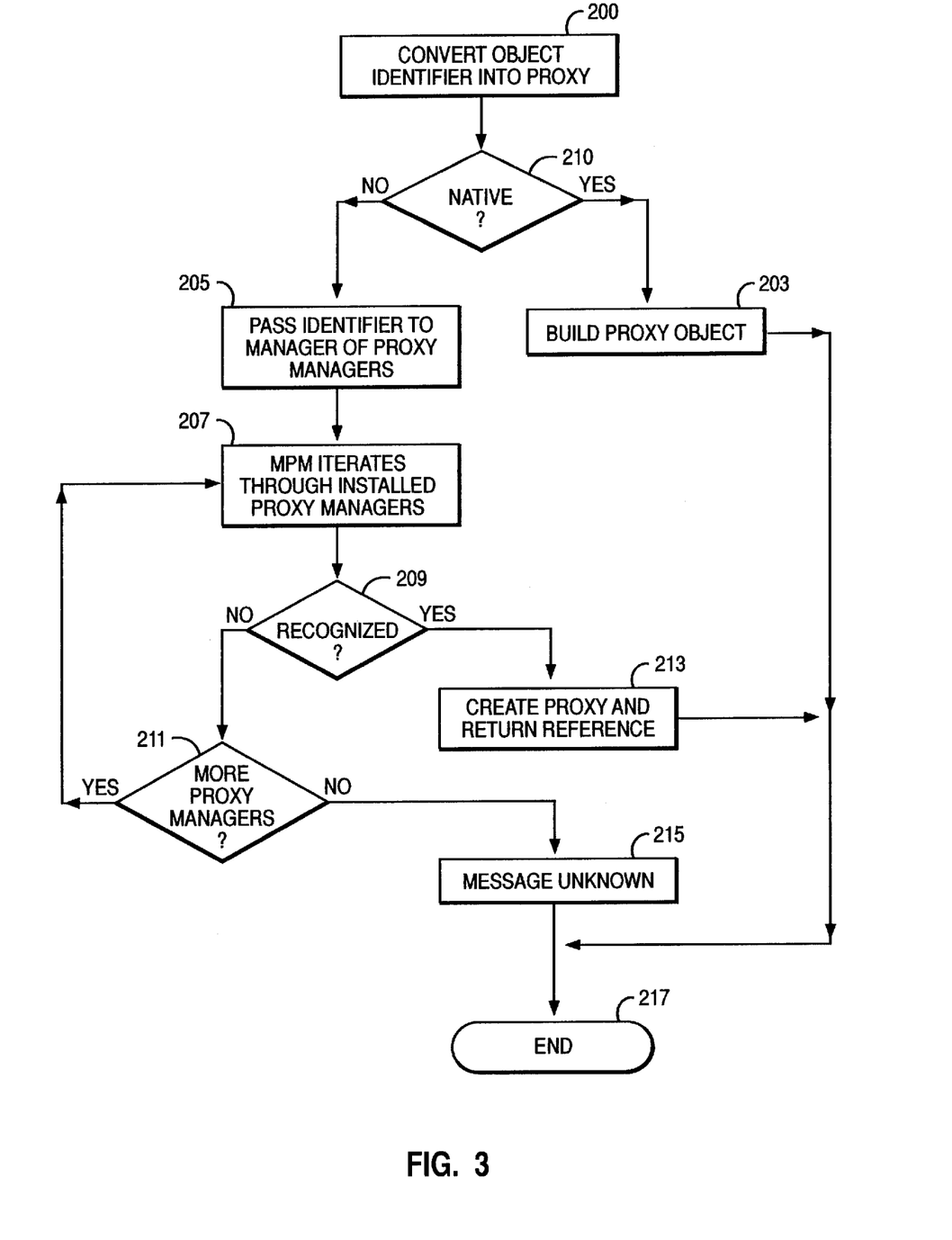
FIG. 3 is a flow diagram of the proxy object management process.

The process to handle requests for communication to remote objects is depicted in the flow diagram of FIG. 3. In step 200, a call for a remote object, including the object identifier is received by the ORB runtime 101. A test in step 201 determines whether the object identifier is recognized by the native ORB. If so, the local proxy manager proceeds to build the proxy object in step 203. This process is described in greater detail with reference to FIG. 4 below.

If the local ORB does not recognize the object identifier, the object is a foreign object belonging to a different ORB. In step 205, the object identifier is passed to the manager of the proxy managers. The manager of proxy managers iteratively queries the installed proxy managers, step 207, for recognition of the object identifier, step 209, until a proxy manager recognizes the object identifier or all the proxy managers have been polled, step 211. The proxy manager which recognizes the object identifier creates the proxy object and returns a pointer to the manager of proxy managers, step 213. If none of the installed proxy managers recognize the object, a message is passed back in step 215 that it is an unknown object. The process ends, step 217.

Figure 4:
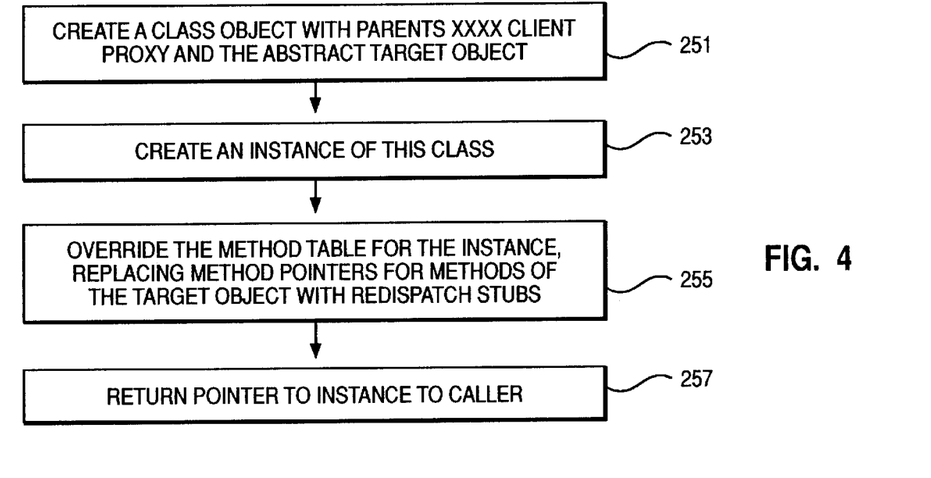
FIG. 4 is a flow diagram of the generation of a proxy object.

The process for creating a proxy object by the proxy manager is depicted in FIG. 4. In step 251, a class object with the xxxClientProxy and the abstract target objects as parent objects. The "xxx" characters are used to denote that these characters will vary according to the target object's native ORB, e.g., DSOMClientProxy, DOMFClientProxy, and also may identify ORB for which the proxy is built. The term "abstract target object" is used to denote an empty "shell" of the target object which includes the interface to actual target object. The derivation of a proxy object using SOM is discussed in greater detail below in connection with FIG. 6. In step 253, an instance of this newly created proxy class object is created, a proxy object. In step 255, the method table for this instance is overridden, replacing the method pointers for methods of the target object with redispatch stubs. This step is discussed in greater detail below in reference to FIGS. 7A and 7B. Finally, in step 257, the pointer to the instance is returned to the calling process.

Figure 5:
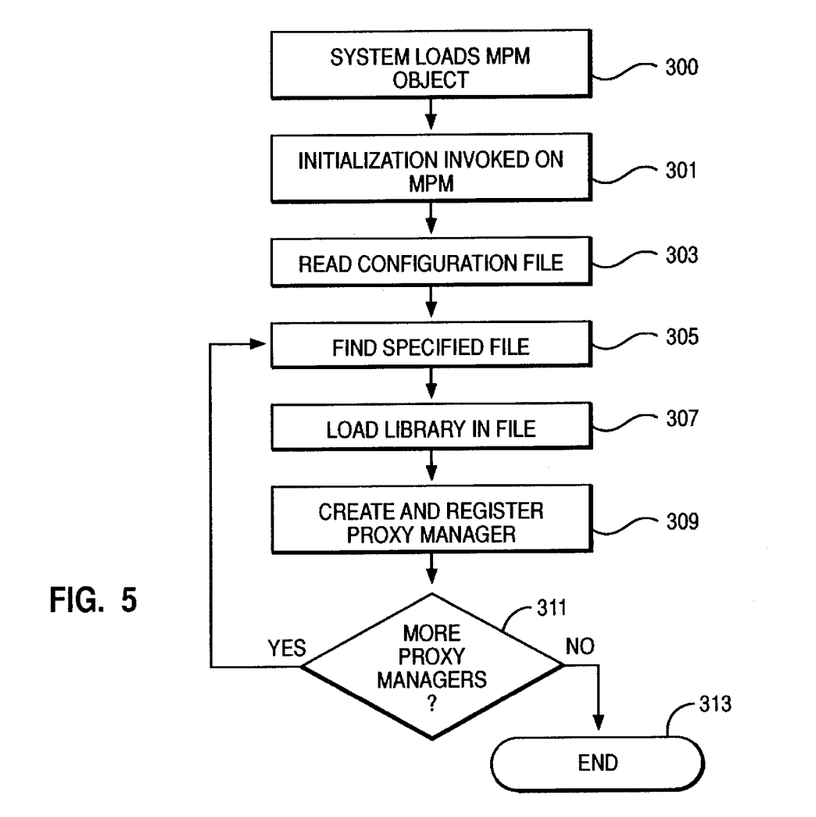
FIG. 5 is a flow diagram of the initialization of the manager of proxy manager object.

The process for initializing the manager of the proxy managers is shown in FIG. 5. The role of the manager of the proxy managers is to register of the proxy managers in the local ORB and to poll the registered proxy managers for recognition of a foreign object reference. In step 300, the ORB retrieves as part of its initialization, the manager of proxy manager object. An initialization function, made by an API call, is performed on the manager of the proxy managers, step 301, as shown by steps in the flow diagram. In step 303, the configuration file for the manager of the proxy managers is read. The configuration file comprises a series of records including the names of proxy manager library files to be loaded. For each record in the configuration file, the specified file is found in the file system, step 305. In step 307, the specified library is loaded. In step 309, the proxy manager code in the file is initialized registered with the manager of proxy managers. A test is performed in step 311 to determine whether there are additional records in the configuration file for other proxy managers. If not, the process ends, step 313.

The initialization described above assumes that the client portions of the foreign ORBs are already installed in the local machine. These client portions can be vastly scaled down versions of the full ORB implementations found in the target machines, but some minimal presence of the foreign ORB must be present on the local machine with which the proxy object to communicate. Potentially, the scaled down client portion of the foreign ORBs could be installed at the same time their respective proxy managers are installed or even incorporated therein.

Figure 6:
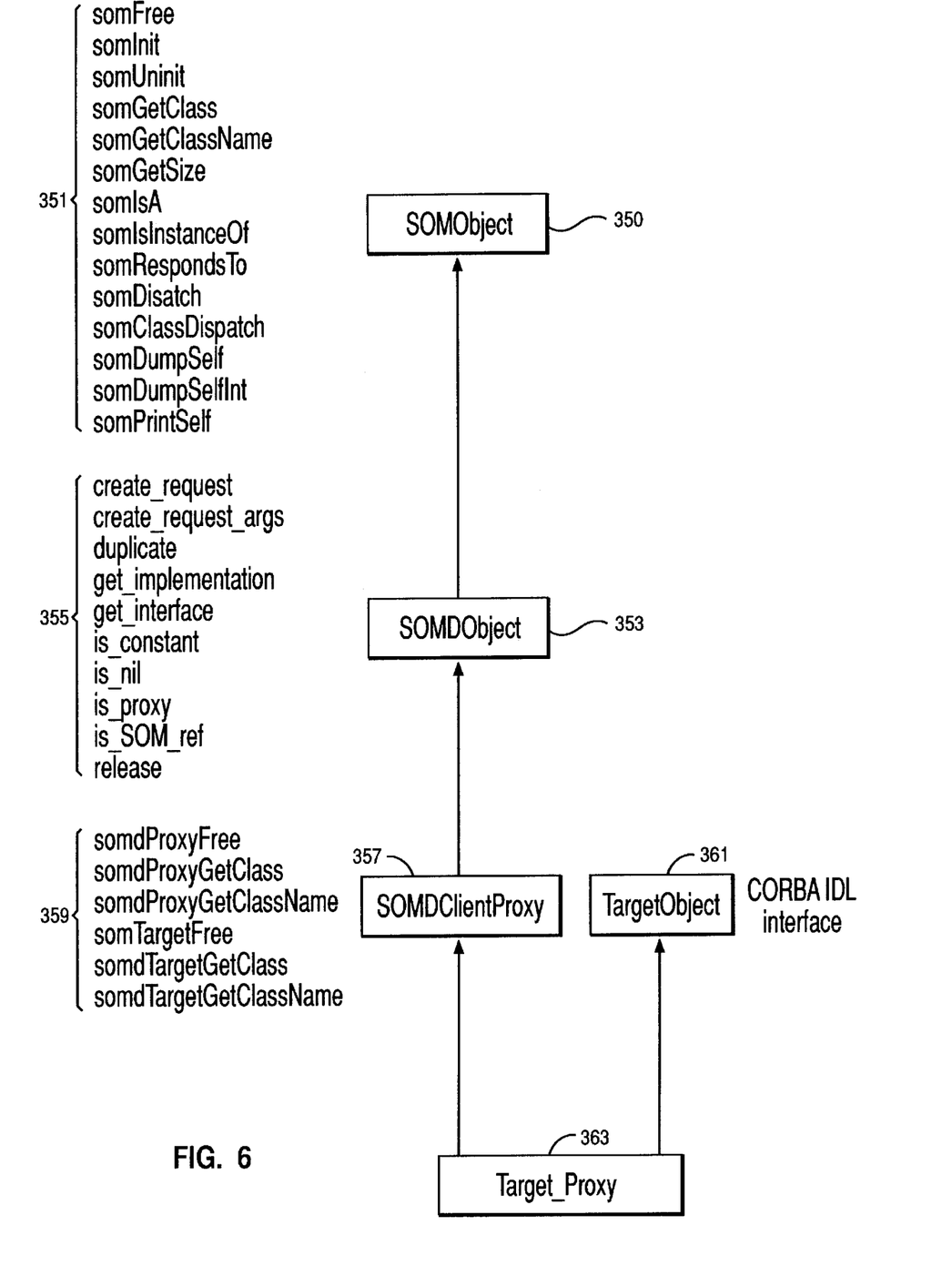
FIG. 6 shows the derivation of a proxy object.

The derivation of a proxy object is shown in FIG. 6. The classes and methods are shown for the DSOM ORB. Other methods and classes would obviously be used for other ORB implementations. Inheritance and subclassing are well known techniques to those skilled in object oriented programming and will not be discussed in detail except as appropriate. All SOM objects are derived from SOMObject class 350 which is the parent of all parent objects. SOMObject 350 includes a set of methods 351 which includes SOMDispatch. Other methods in SOMObject are relevant for obtaining information about a particular SOMObject class, initialization, diagnostics, debugging and other purposes. The distributed SOM objects are all members of the SOMDObject class 353 which is the child of SOMObject 350. SOMDObject 353 inherits all those methods from SoMObject 350 and is further subclassed by including a group of other methods 355.

The functions added in the SOMObject are ones specified by the CORBA specification and are relevant to CORBA computer objects.

In turn, the proxy class object, SOMDClientProxy 357 is a child of the SOMDObject 353, containing all of the methods of the SOMObject 350 and SOMDObject, as well as a group additional of methods 359. The methods 359 added to the SOMDClientProxy class are unique to the particular ORB with which the proxy class is associated. Also, the SOMDispatch method is overwritten to send messages to the ORB rather than the method table. The abstract target object class 361 is basically the interface between a target object and its clients. In SOM, there is an interface repository from which the target object interface can be retrieved. The SOM compiler places the interface information in the interface repository when objects are compiled. In addition, when the DSOM ORB receives a new object reference due to method invocation or other process the interface is added to the reposition. Those skilled in the art would think of alternative methods of making the abstract target object available. A class proxy object for the ORB TargetProxy 363 is created by using the SOMDClientProxy and TargetObject 361 as parents. From this class object, proxy object instances are created for particular target objects in the foreign ORB.

Figure 7A:
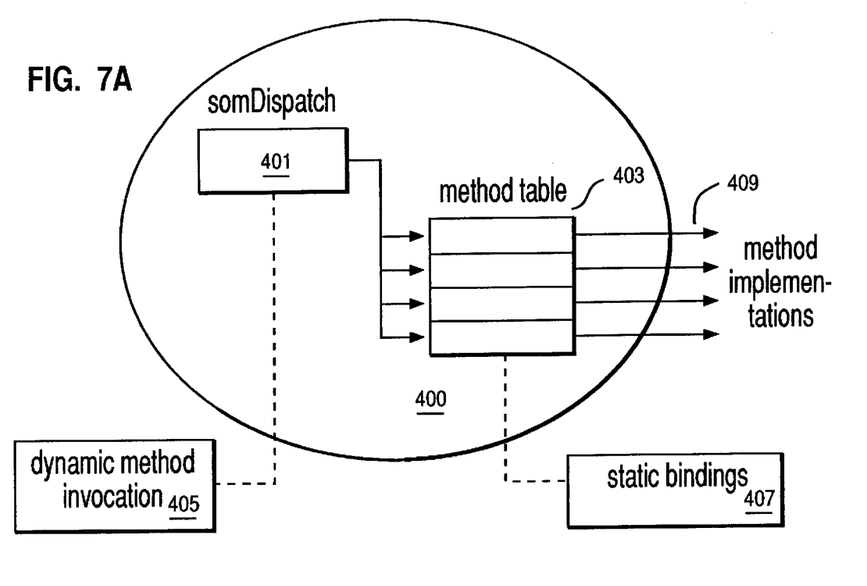
FIGS. 7A and 7B show a SOM object without somDispatch overridden and a proxy object with somDispatch overridden.

Overriding the method table in the proxy object is discussed below with reference to FIGS. 7A and 7B. A typical SOM object 400 is shown in FIG. 7A. A SOM object 400 can invoke methods dynamically through the SOMDispatch method or statically by referring to method table 403. Dynamic method invocation provides greater flexibility by allowing a new method call 405 to be constructed and invoked by the SOMDispatch method 401 for methods for which are built during run time or were not anticipated at the time the object was written. The method table 403 contains pointers to the code known to the developer and is defined by static bindings 401 written in the IDL source module from which the object is derived. Referring to the method table, while less flexible, is much faster than the dynamic method invocation process. The pointers in the method table are used to invoke method calls 409 on the code implementation which performs the requested method.

A method table is used in many object oriented languages as a mechanism for associating a method call with the code that implements the method functionality. When a method is called on an object, the object oriented runtime checks the method table to find where the implementation for the method is stored and executes this code. The benefit of using a method table is that the implementation for a method can be changed simply by changing the reference in the method table from the original implementation to the new implementation. This is, for example, how many object oriented languages support overriding method implementations when sub classing objects. A method table is a data structure that is used to select which piece of code gets executed as the result of a method call. This selection of execution process is referred to as method dispatch.

Figure 7B:
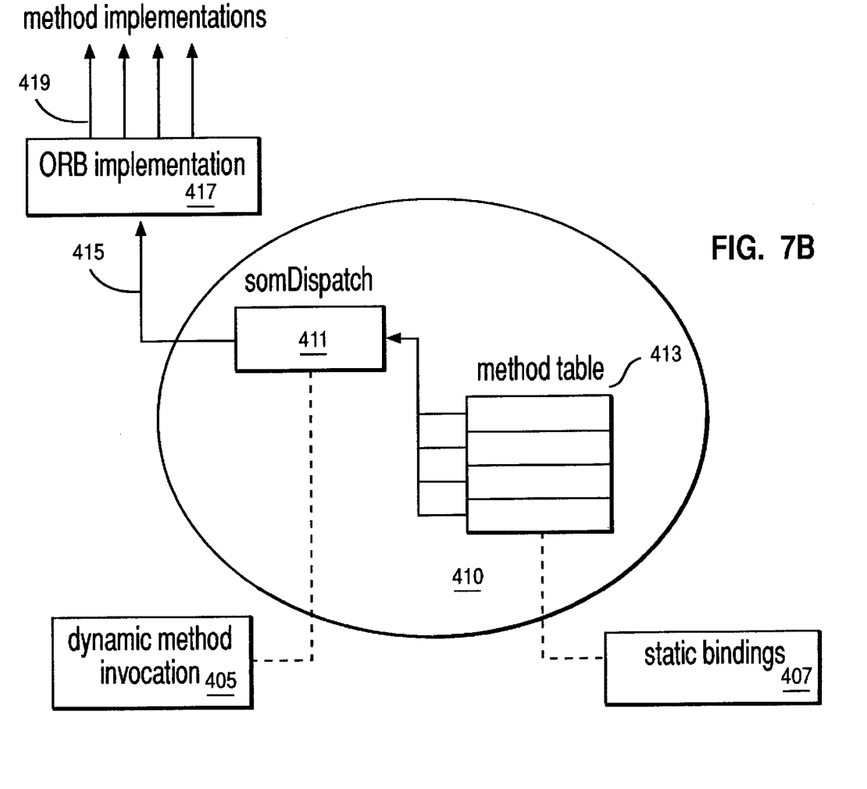

Referring to FIG. 7B, the SOMDispatch method is overridden in the proxy object 410 to send the method call to an ORB implementation rather than the method table. Some interesting changes are made to the method table to build proxy objects as shown in FIG. 7B. Essentially, a proxy object is built to look like the target object from an application programming interface perspective. However, when a method is called on the proxy object, the call is intercepted and sent across the network to the target object instead of being executed locally. This is accomplished by overwriting the proxy object's method table 413 for methods on the target object with new references called redispatch stubs to a routine called somDispatch which contains the code to repackage the method call and send it across the network to the target object.

Figure 8:
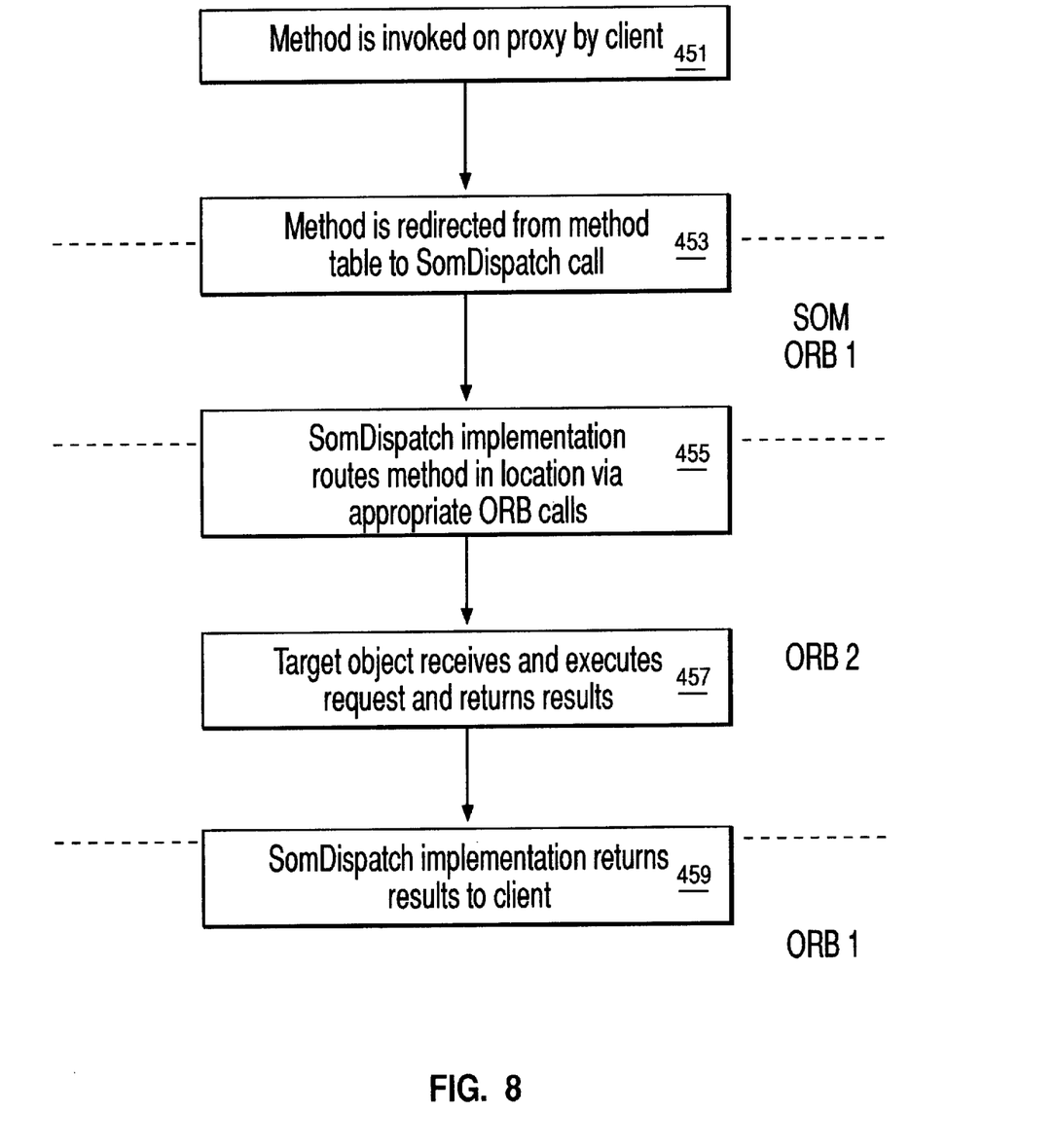
FIG. 8 is a flowchart of a call from a client object in a first address space to a target object in a second address space.

FIG. 8 is a flow chart of the call from a client object in a first address space to a target object in a second address space according to the invention. Once the proxy object has been created and the pointer to the proxy object is returned to the client, the client decides to invoke a method on the proxy in step 451. As discussed above, the client object appears to be calling a local copy of the target object. In step 453, a method invocation is redirected from the method table and the proxy object to the SOMDispatch method. The SOMDispatch method enables the routing of the message from the ORB and address space in which the client is resident to the ORB and address space in which the target object is found. In step 455, SOMDispatch method routes the call via the appropriate ORB calls. For example, SOMDispatch could use the CORBA-defined dynamic integration interface to execute a method on a remote object in a foreign ORB. In step 457, the target object receives the client's request, executes the request, and returns the results back to the ORB. The proxy object returns the results of the target object's actions to the client.

Figure 9:
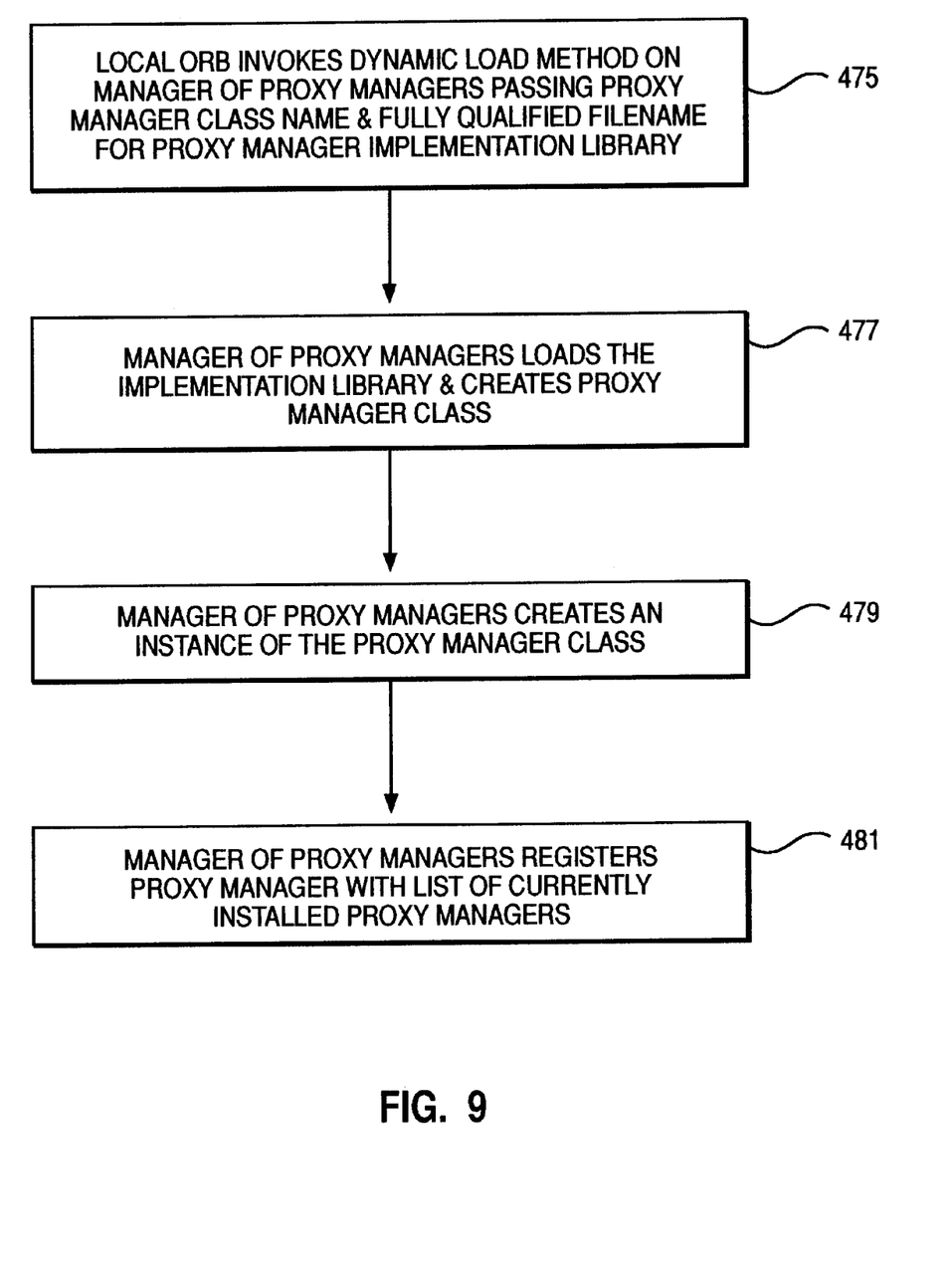
FIG. 9 shows the registration of a proxy manager.

In the initialization of the manager of proxy manager object depicted in FIG. 5, the registration of the proxy managers is dependent on hard coding within the configuration file. In that embodiment, the configuration file would need to be updated for new ORBs and proxy managers, or, would be limited to those ORBs proxy managers known to the developer at the time the configuration file was written. The invention also encompasses a dynamic method of registering the proxy managers with the manager proxy manager object. As depicted in FIG. 9 in step 475, the local ORB runtime invokes the dynamic load method on the manager proxy managers. This is accomplished in part by passing the manager of proxy managers a class name and a fully qualified file name for the new proxy manager implementation library. Next, in step 477 the manager of proxy manager loads the implementation library and creates a new proxy manager class. In step 479, the manager of proxy managers creates an instance for the new proxy manager class. In step 481, the manager of proxy managers registers the new proxy manager with a list of currently installed proxy managers.

Figure 10:
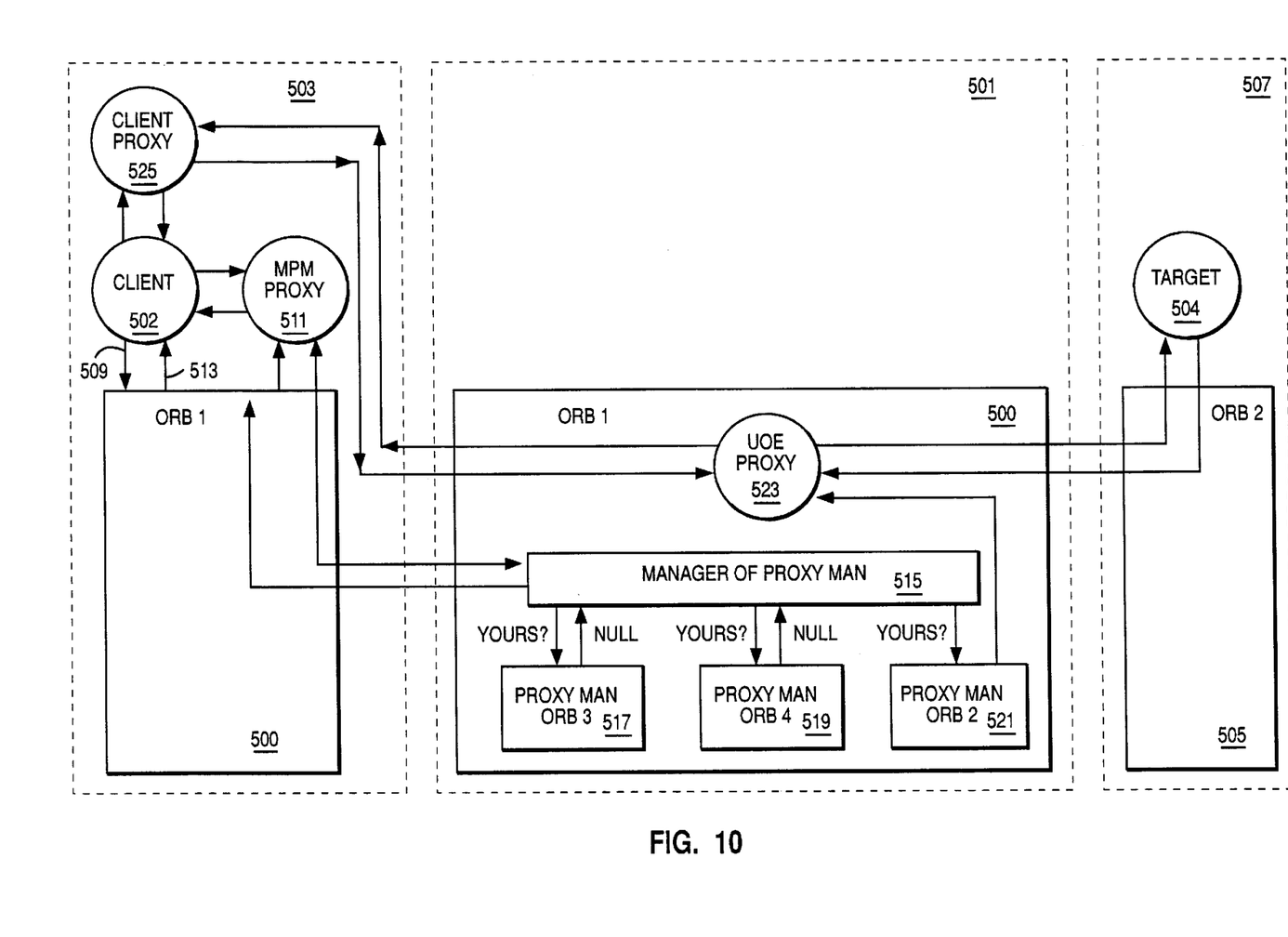
FIG. 10 shows a second embodiment of the invention.

A second embodiment of the invention is depicted in FIG. 10 wherein the manager of proxy managers and the set of proxy managers to the respective foreign ORBs are located on a gateway machine. A plurality of client machines from both the native and foreign ORBs may call the gateway machine for communication services to other ORBs. This design has an advantage in keeping the overhead associated with the method localized to the gateway server which would typically be a powerful computing system. Client machines with relatively few resources could call into the gateway machine to communicate with other ORBs without incurring the overhead associated with manager of proxy manager and proxy manager objects with each machine. While the embodiment described above has a relatively localized impact on the ORB in terms of coding changes, each proxy manager and proxy object can have a cumulative effect on system performance. In the first embodiment, the manager of proxy managers and set of proxy managers would have to be repeated for each machine in each ORB. In the gateway concept, only one gateway machine need be equipped with the MPM and proxy managers for foreign ORBs in a single ORB to allow a plurality of ORBs to communicate with a minimum amount of overhead. Also, each machine needs to have the foreign ORB client software installed/loaded in the first embodiment. Only the gateway machine needs the foreign ORB software in the second embodiment. The disadvantage of the second embodiment is that two proxy objects are used to pass the request from client to target object resulting in some loss in performance.

In FIG. 10, a first ORB 500 is present in the address space 501 of the gateway machine and the address space of the client machine 503. For ease in illustration, a single client of the native is depicted, although many such clients could and probably would be coupled to the gateway. A client object 502 resident on the client machine wishes to request the service from a target object 504 written to a second ORB 505 in the address space 507 of a remote machine. Again, a plurality of ORBs and target remote machines objects would be coupled to the gateway machine, but are not illustrated. In response to a call 509 for the target object 504, the ORB 500 in the client machine creates a manager of proxy manager proxy 511 (MPM proxy) and returns a pointer 513 to the MPM proxy to the client object. The MPM proxy 513 may have already been created in response to a previous call in which case a pointer is passed back immediately. The client object 502 through MPM proxy 511 passes the object references to the manager of proxy managers 515 in the address space 501 of the gateway machine. In response, the manager of proxy managers 515 queries the proxy managers 517, 519, 521 until it finds a proxy manager 521 which understands the foreign object reference. This proxy manager 521 creates the Universal Object Encapsulater proxy (UOE proxy) 523 through which communication into the target object 504 is accomplished. A pointer to the UOE proxy is passed back to the ORB in the client machine which creates a client UOE proxy object 525 and a pointer to the requesting client object 502. The client 502 communicates through the client UOE proxy 525 and the UOE proxy 523 to the target object 504.

Figure 11:
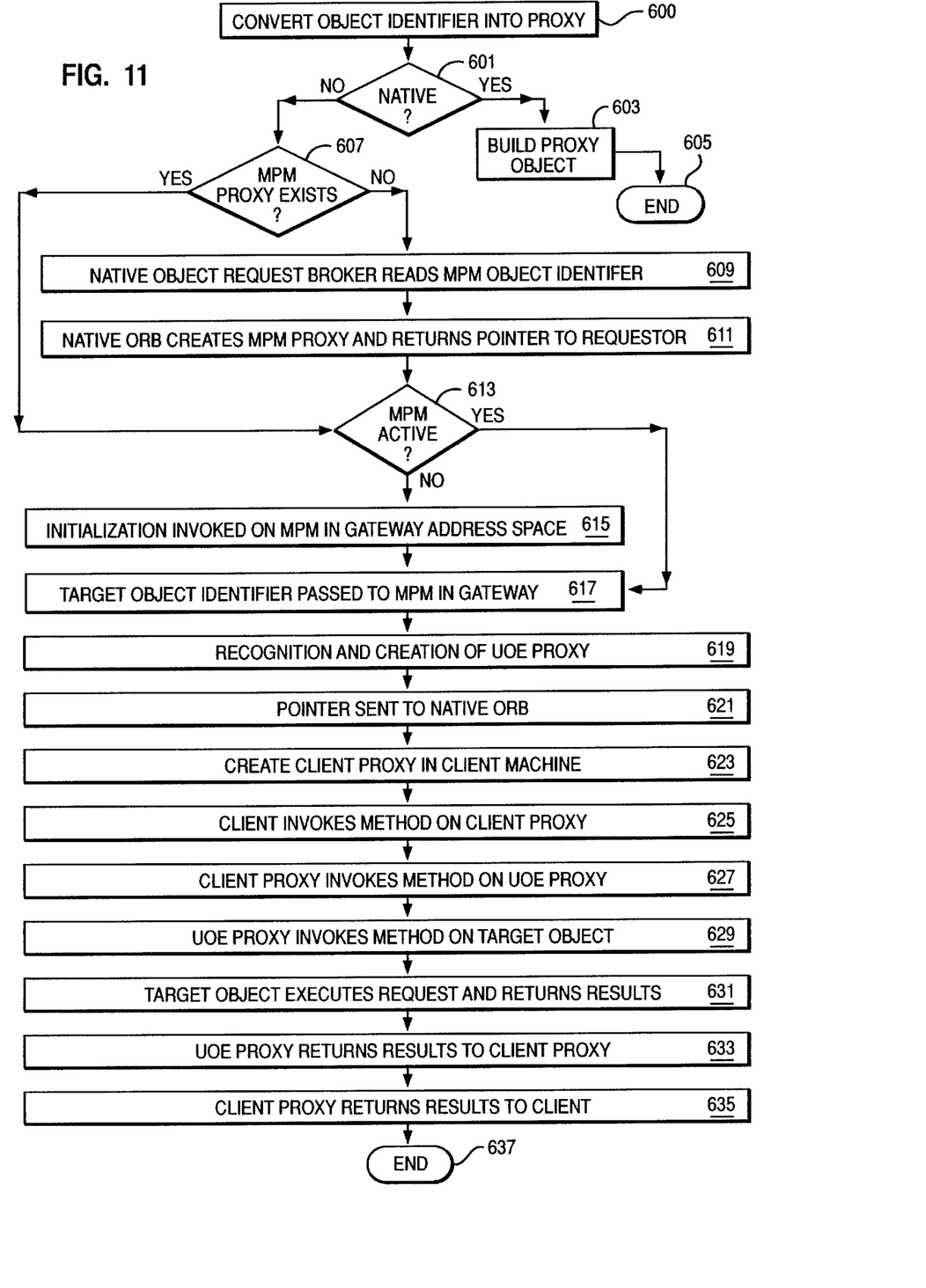
FIG. 11 is a flow chart of a call from a client object in a first address space to a target object in a second address space in the second embodiment of the invention.

FIG. 11 shows the process of the second embodiment. In step 600, a call including a foreign object identifier from the client object to the ORB results in the decision to install the MPM proxy object and initialize the MPM at the gateway. In step 601, the decision object whether the target object is native to the ORB is made. If native, it is assumed that the ORB in the client machine has a proxy manager for ORB or is otherwise able to create its own proxys for native objects, step 603. The process ends, step 605. Next, in step 607, a test is performed to determine whether the MPM proxy exists.

The MPM proxy allows requestors in the client machine to transparently send requests to the gateway MPM as though it was residing in the client machine. If not, in step 613, a test is performed to determine whether the manager of proxy managers is already installed in the gateway machine. In the event that is not, the native ORB in the client system in step 601 reads the object reference of the MPM from a configuration file. In step 611, the client system creates a local copy of the manager of proxy manager proxy object. The process of creating the MPM proxy could be as described above or could be performed according to a COBRA specified string-to-object method which returns an object in response to an object reference. The MPM proxy is installed and the pointer to the MPM proxy is returned to the client. In step 615, the initialization of manager of proxy managers is invoked. This process basically repeats steps 303 through 313 in FIG. 5 and occurs outside the client address space in the gateway machine.

In step 617, the client object in the client machine invokes a method including the target object identifier foreign to the native ORB which is passed to the manager proxy managers in the gateway via the MPM proxy. In step 619, the recognition of the target object identifier in creation of the UOE proxy occurs. This process is basically similar to steps 207–213 in FIG. 3 above except that it takes place in the gateway machine rather than locally. Once the UOE proxy is created in the gateway machine, in step 621, a pointer is sent back to the native ORB in the client machine. In step 223, the native ORB creates the client proxy in the client machine passes a pointer to the clientproxy back to the client object which made the original request.

In step 625, the client invokes a method on the client proxy. In step 627, SOMDispatch in the client proxy has been redirects the invoked method on the remote UOE proxy via the native ORB runtimes in the client and gateway machines. In the UOE proxy, the SOMDispatch process invokes the method on the remote target object via native ORB in the gateway machine and the foreign ORB in the target machine, step 629. In step 631, the target object executes the request and returns the result to the UOE proxy. In step 633, the UOE proxy returns the results to the client proxy which returns the results to the client object in step 635. The process ends, step 637.

Figure 12:
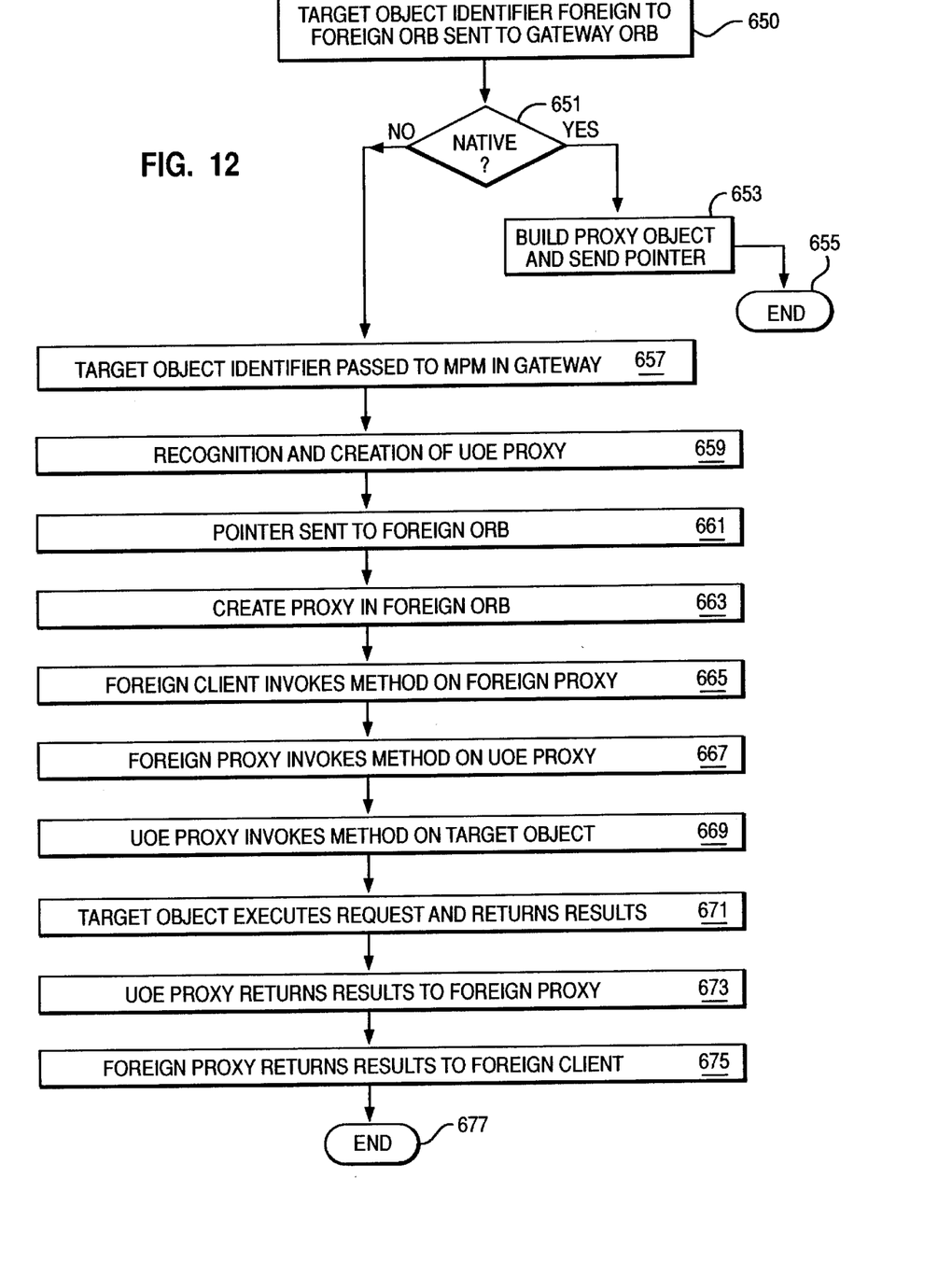
FIG. 12 is a flow chart of a call from a foreign requester to the gateway machine in the second embodiment.

As mentioned above, another of the advantages of the second embodiment is that requester objects on client machines written to foreign ORBs may call the gateway machine to resolve a foreign target object identifier. The only overhead incurred is the necessary code to send the target identifier object identifier to the gateway machine if unrecognized. In FIG. 12, as shown in step 615, the foreign ORB was unable to resolve a target object identifier and has sent it to the gateway ORB. In step 651, the determination is made whether the target object identifier is native to the gateway ORB. If so, the normal proxy object is built in step 653 and the pointer to the proxy object is sent back to the foreign ORB. The process would end in step 655. If, however, the target object is not native to the gateway ORB, in step 657, the target object identifier is passed to the manager of proxy managers in the gateway. As discussed above, the recognition and creation of a UOE proxy would occur, step 659. In step 661, a pointer would be sent to the foreign ORB which could create a proxy object in step 663. Alternatively, other communication means in the foreign ORB may allow the requester in the foreign ORB to talk directly to the UOE proxy.

In step 665, the foreign requester invokes a method on the foreign proxy and the foreign client. In step 667, foreign proxy through the foreign ORB invokes the method on the UOE proxy. In step 669, the UOE proxy invokes the method on the target object. In step 667, the target object executes the request and returns the results to the UOE proxy. In step 663, the UOE proxy returns results to the foreign proxy and in step 675 the foreign proxy returns results to the foreign client in the foreign ORB. The process ends step 667.

The invention has the following benefits: It has a small, localized impact on ORB implementations. Each ORB implementation provides a proxy manager capable of recognizing a native object reference and constructing a proxy for the target object. In the preferred embodiment, SOM provides all necessary support for dynamically generating proxy objects. Each implementation provides a supporting class which implements the mechanism for remote method redispatch. In the preferred embodiment, the supporting class is derived from SOMDObject for remote method redispatch. Each implementation must be capable of recognizing a foreign object reference and passing it the manager of proxy managers for resolution. It does not impact native ORB transport, object reference format or message format. A single gateway framework is required regardless of the number of ORBs to be interconnected.

While the invention has been shown and described with reference to particular embodiments thereof, it will be understood by those skilled in the art that the foregoing and other changes in form and detail may be made therein without departing from the spirit and scope of the invention.

We claim:

1. A method for passing a request from a requester in a first address space to a target object in a second address space, comprising the steps of:

passing the request from the requester to a native object request broker having multiple object models to which the requester is written, said native object request broker having a defined object-oriented interface and isolated from said requester;

responsive to a determination that the target object is foreign to the native object request broker, finding a foreign object request broker having multiple object models to which the target object is written, said foreign object request broker having the defined object-oriented interface and a plurality of proxy manager objects under the control of a single manager;

generating a proxy object by the foreign object request broker written to the foreign object request broker in the first address space by one of said plurality of proxy manager objects selected by said manager; and establishing communication by the foreign object request broker from the requester object to the target object through the proxy by said one of said plurality of proxy manager objects.

2. The method as recited in claim 1 wherein the finding step comprises the step of repetitively passing the request to a set of proxy managers each of which generate proxy objects for a respective foreign object request broker until the target object's foreign object request broker is recognized by one of the proxy managers, and wherein the generating step is accomplished by the recognizing proxy manager.

3. A method of passing requests between address spaces in a computer network, comprising the steps of:

passing a request from a requester to a native object request broker having multiple object models and a defined object-oriented interface isolated from said requester, both in a first address space of a first computer system coupled to the network;

responsive to a determination that a target object of the request is foreign to the native object request broker, finding a foreign object request broker having multiple object models within a plurality of proxy manager objects under the control of a single manager and the defined object-oriented interface to which the target object is written;

generating a proxy object by said foreign object request broker in the first address space to communicate with the foreign object request broker using one of said plurality of proxy manager objects selected by said manager and the target object both in a second address space of a second computer system coupled to the network; and establishing communication by the foreign object request broker from the requester to the foreign object request broker and the target object through the proxy object by said one of said plurality of proxy manager objects.

4. The method as recited in claim 3 wherein the finding step comprises the step of repetitively passing the request to a set of proxy managers each of which generate proxy objects for a respective foreign object request broker until the target object's foreign object request broker is recognized by one of the proxy managers, and wherein the generating step is accomplished by the recognizing proxy manager.

5. The method as recited in claim 4 wherein the finding and generating steps are accomplished in and the set of proxy managers is in a third address space on a gateway computer system, the first, second and gateway computer systems coupled together by means of a network.

6. The method as recited in claim 2 wherein the first and second address spaces are in a computer system and the set of proxy managers is in the first address space.

7. The method as recited in claim 5 wherein the repetitive passing step is accomplished by a manager of proxy manager object in the third address space and the method further comprises the steps of:

generating a manager of proxy manager proxy object in the first address space by the native object request broker, the manager of proxy manager proxy object establishing communication between the requestor object and the manager of proxy manager object;

passing a pointer to the proxy object generated by the recognizing proxy manager to the native object request broker in the first address space;

wherein the proxy object generated in the first address space is a requestor proxy object and communication from the requestor to the proxy and target objects is established through the requestor proxy object.

8. The method as recited in claim 5 further comprising the steps of:

passing a second request from a foreign requester in the second address space to a native request broker in the third address space;

responsive to the determination that a target object of the second request is foreign to the native request broker, finding a second foreign object request broker to which the target object of the second request is written;

generating a second proxy object in the third address space to communicate with the second foreign object request broker and the target object of the second request both in an address space of a computer system coupled to the network; and establishing communication from the foreign requester to the second foreign object request broker and the target object of the second request through the second proxy object.

9. The method as recited in claim 5 further comprising the steps of:

passing a second request from a foreign requestor in the second address space to a native request broker in the third address space;

responsive to the determination that a target object of the second request is native to the native request broker, generating a second proxy object in the third address space to communicate with the target object of the second request in an address space of a computer system coupled to the network, the generating step performed by the native request broker; and establishing communication from the foreign requestor to the target object of the second request through the second proxy object.

10. A computer network in which requests are passed between address spaces in respective computer systems, comprising:

a requestor and a native object request broker having multiple object models in a defined object-oriented interface, both in a first address space of a first computer system coupled to the network;

a foreign object request broker having the defined object-oriented interface and multiple object models within a plurality of proxy manager objects under the control of a single manager and a target object both in a second address space of a second computer system coupled to the network; and communication means in the native object request broker and the foreign object request broker to pass requests within an address space and between address spaces in the network;

means for finding the foreign object request broker to which the target object is written using one of said plurality of proxy manager objects selected by said manager which is employed when the requester makes a request to the target object which is foreign to the native object request broker;

a proxy object in the first address space to communicate with the foreign object request broker and the target object; and wherein communication from the requester to the foreign object request broker and the target object is established through the proxy object by said one of said plurality of proxy manager objects.

11. The network as recited in claim 9 wherein the finding means further comprises a manager of proxy manager object which repetitively passes the request to a set of proxy managers each of which generate proxy objects for a respective foreign object request broker until the target object's foreign object request broker is recognized by one of the proxy managers.

12. The network as recited in claim 10 wherein proxy objects are generated by the set of proxy managers.

13. The network as recited in claim 11 further comprising a third address space on a gateway computer system in which the manager of proxy managers and set of proxy managers reside, the first, second and gateway computer systems coupled together by means of a network.

14. The network as recited in claim 12 further comprising:

a gateway proxy object generated by the recognizing proxy manager in the third address space;

wherein the proxy object generated in the first address space is a requestor proxy object and communication from the requestor to the gateway proxy and target objects is established through the requestor proxy object.

15. The network as recited in claim 12 further comprising:
- a foreign requester in a fourth address space which passes a second request to the manager of proxy managers in the third address space; and
- a second proxy object generated in the third address space by one of the set of proxy managers which communicates with a second foreign object request broker and a target object of the second request both in a fifth address space of a computer system coupled to the network.

16. A computer memory for storing a set of instructions for passing requests between memory address spaces, comprising:
- a native object request broker having a defined object-oriented interface and multiple object models stored in an address space of the memory for passing requests between requesters and target objects;
- a set of proxy managers under the control of a single manager stored in an address space of the memory each of which generate proxy objects for a respective foreign object request broker; and
- the single manager of said set of proxy managers stored in the address space of the memory repetitively passing a request from a requester to the set of proxy managers until a foreign object request broker having the defined object-oriented interface and multiple object models for a foreign target object associated with the request is recognized by one of the proxy managers.

* * * * *